(No Model.)
R. E. GLOVER.
WEIGHING SCALES.
No. 409,191. Patented Aug. 20, 1889.
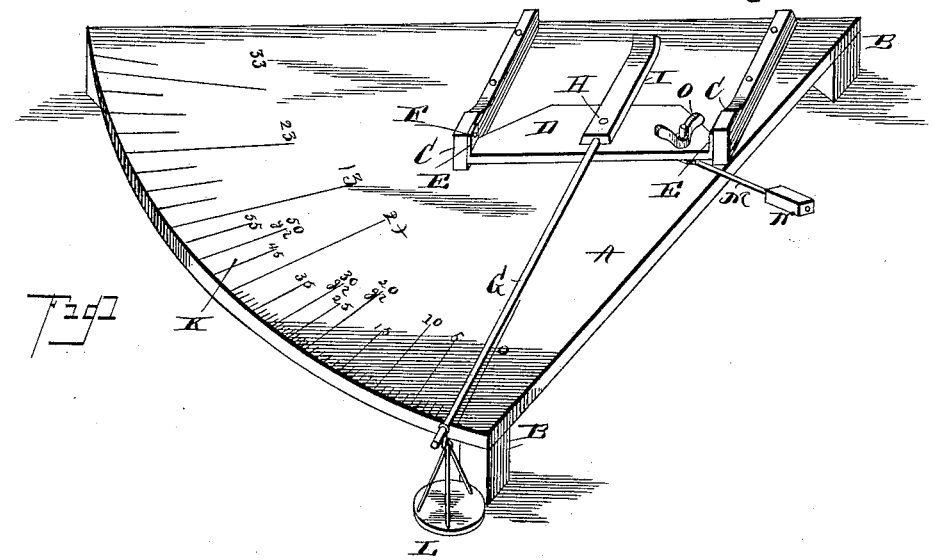
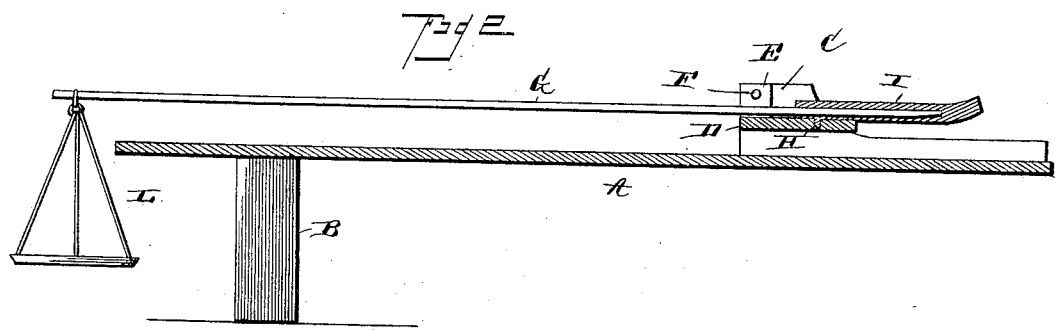

UNITED STATES PATENT OFFICE.

ROBERT EMETT GLOVER, OF GRANGER, MISSOURI.

WEIGHING-SCALES.

SPECIFICATION forming part of Letters Patent No. 409,191, dated August 20, 1889.

Application filed March 19, 1889. Serial No. 303,833. (No model.)

*To all whom it may concern:*

Be it known that I, ROBERT EMETT GLOVER, a citizen of the United States, residing at Granger, in the county of Scotland and State of Missouri, have invented a new and useful Improvement in Scales, of which the following is a specification.

My invention relates to an improvement in scales for weighing drugs and other articles in small quantities; and it consists in the peculiar construction and combination of devices, that will be more fully set forth hereinafter, and particularly pointed out in the claims.

In the accompanying drawings, Figure 1 is a perspective view of scales embodying my improvement. Fig. 2 is a sectional view of the same.

The quadrant-shaped table or base A is provided at its corners with depending legs or supports B, and on the said table, near the inner corner thereof, is a pair of bearings C. A fulcrum-plate D is arranged between the said bearings, and has a pair of upturned ears E at its corners, through which extend pivotal pins F, that project from the inner side of the bearing-blocks. A scale-arm G is pivoted on the center of the plate D, at a point beyond the axis thereof, by means of a pin or stud H, and on the shorter end of the said arm is attached a weight I, while the outer end of the arm is adapted to sweep over a graduated scale K on the face of the table, near the curved edge thereof, the said arm supporting the scale-pan L. The weight I is sufficiently heavy to just balance the empty scale-pan when the arm G is at exactly right angles to the fulcrum-plate.

An adjusting-arm M is pivoted to the fulcrum-plate, and carries a weight N, and the vertical inner end of the said arm is provided with a thumb-nut O, by which said arm may be rotated, and thus cause the weight to be extended to any desired distance from the fulcrum-plate.

The operation of my invention is as follows: When the arm G vibrates from its normal position at right angles to the fulcrum-plate and from the zero-mark on the scale, the center of gravity moves back from the fulcrum of the arm G to the weighted end thereof, and the figures on the dial under the arm G, when the latter is brought to rest, indicate the weight of material necessary to balance the arm G. Thus if it is desired to weigh two scruples of a commodity the arm G is turned until its outer end is over the appropriate mark on the dial, and it will then require exactly two scruples of the commodity when placed in the pan to balance the arm.

The function of the adjusting-arm M is to compensate for any imperfection in the construction of the mechanism and to enable the scale-arm G to be balanced with a paper or other substance on the pan, the weight of the paper not being a part of the weight of the commodity placed in the pan, and this is readily accomplished by turning the thumb-nut O in such manner as to adjust the weight N, the arm M being slotted for that purpose to the necessary distance from the fulcrum-plate.

It is obvious from the foregoing description that no weights or springs are necessary as a part of the scales other than the weight I on the short end of the scale-arm and the adjusting-weight N, and that the scales are adapted to weigh small commodities with very great accuracy and with great rapidity.

Having thus described my invention, what I claim is—

1. The combination, in the scales having the pivoted fulcrum-plate, of the scale-arm G, pivoted thereon at a distance beyond the pivotal axis of the fulcrum-plate, the shorter end of the said arm having a counterbalancing-weight and the longer end thereof being adapted to support the scale-pan, substantially as described.

2. The table or base having the graduated scale K, the fulcrum-plate pivoted in bearings on said table or base, and the scale-arm pivoted to the fulcrum-plate at a point beyond the pivotal axis of the latter, the shorter end of said arm having a counterbalancing-weight and the longer end thereof being adapted to support the scale-pan, all in combination, substantially as described.

3. In scales, the combination, with the pivoted fulcrum-plate, of the scale-arm pivoted thereon at a point beyond the pivotal axis of the fulcrum-plate, said scale-arm having the counterbalancing-weight, for the purpose set forth, and the adjusting-arm M, pivoted to the fulcrum-plate and having the weight N, substantially as described.

In testimony that I claim the foregoing as my own I have hereto affixed my signature in presence of two witnesses.

ROBERT EMETT GLOVER.

Witnesses:
R. D. CRAMER,
ED BUTLER.